Jan. 23, 1951
F. L. DODGE
2,539,235
WORK SUPPORTING MECHANISM FOR
THE SPINDLES OF MACHINE TOOLS
Filed July 3, 1947
2 Sheets-Sheet 1
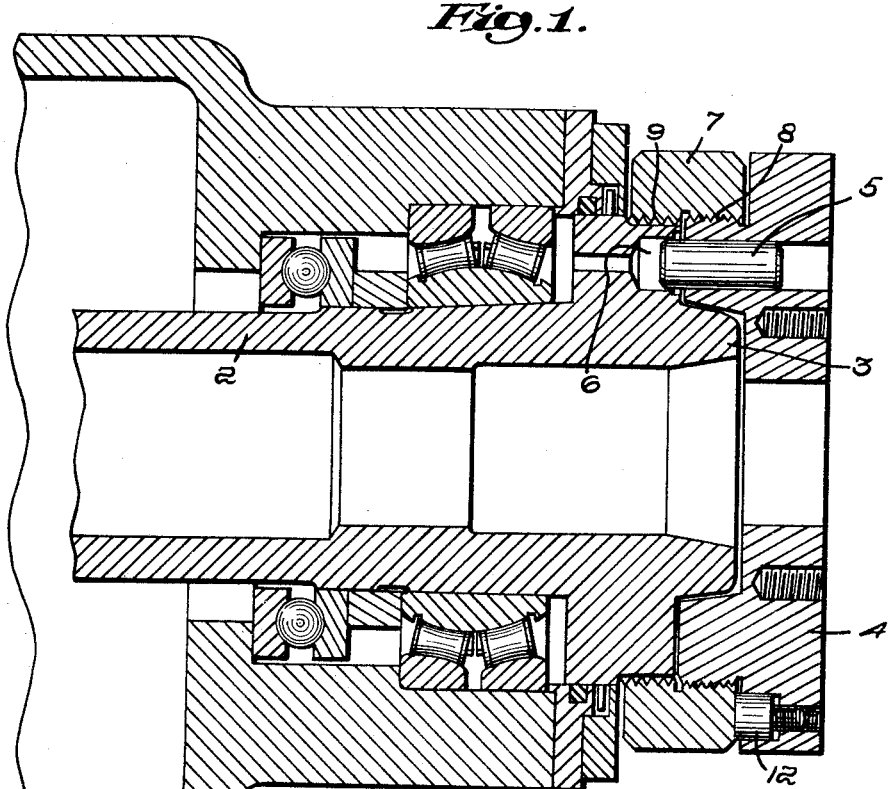
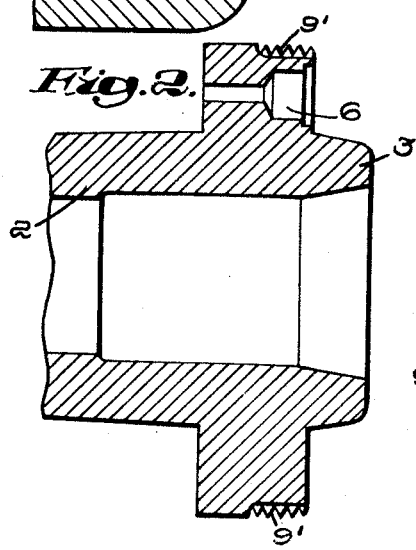
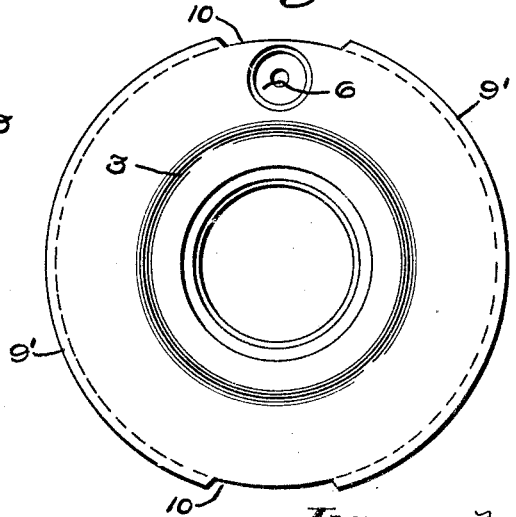
Inventor:
Floyd L. Dodge,
by
Attorney Jan. 23, 1951   F. L. DODGE   2,539,235
WORK SUPPORTING MECHANISM FOR
THE SPINDLES OF MACHINE TOOLS
Filed July 3, 1947   2 Sheets-Sheet 2
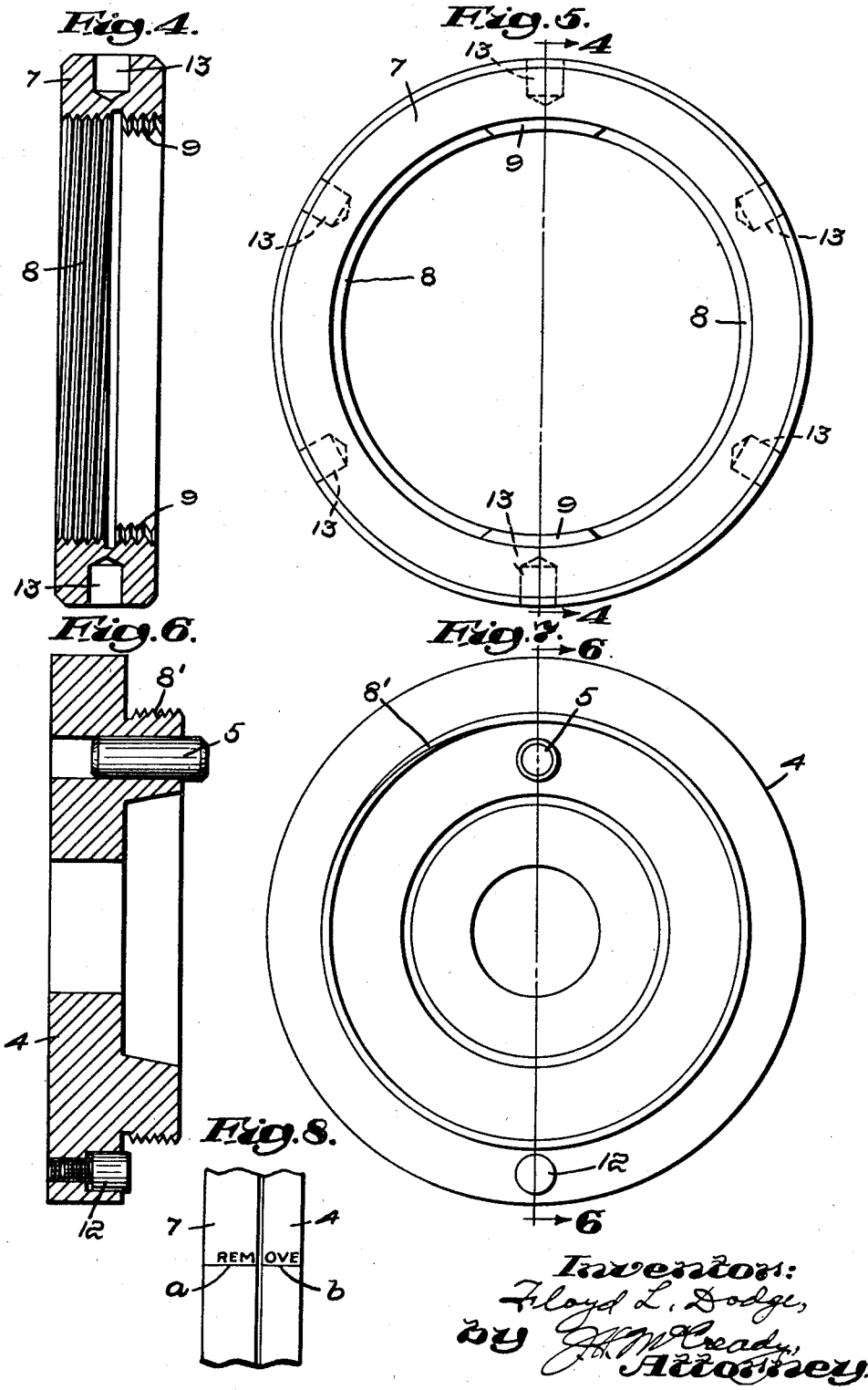

Patented Jan. 23, 1951

2,539,235

UNITED STATES PATENT OFFICE 2,539,235

WORK SUPPORTING MECHANISM FOR THE SPINDLES OF MACHINE TOOLS

Floyd L. Dodge, Waltham, Mass., assignor to The Wade Tool Co., Waltham, Mass., a partnership Application July 3, 1947, Serial No. 758,934

4 Claims. (Cl. 287—117)

This invention relates to lathes and other machine tools in which a spindle is provided with some means, such as a chuck, face plate, or the like, for securing a work piece to it while the desired mechanical operations are performed on the work. For convenience these work holding devices will usually be hereinafter referred to generically as "face plates" or "a face plate," inasmuch as the exact character of these devices is not material to the present invention.

In a machine shop handling a general line of jobbing, repair or machine-shop work, frequent changes of the face plates must be made. These operations require much time because of the nature of the connections ordinarily provided between the spindle and the face plate.

The present invention aims to devise a construction for releasably securing a face plate to a spindle nose in such a manner that changes of the face plates can be made quickly and easily.

The nature of the invention will be readily understood from the following description when read in connection with the accompanying drawings, and the novel features will be particularly pointed out in the appended claims.

In the drawings,

Fig. 1 is a vertical, sectional view of a typical spindle nose and face plate construction modified, however, in accordance with the present invention;

Fig. 2 is a sectional view of the spindle nose;

Fig. 3 is an end elevation of said spindle nose;

Figs. 4 and 5 are sectional and elevational views, respectively, of a clamping ring which forms an important part of this invention;

Figs. 6 and 7 are front elevations and vertical sections, respectively, of a face plate constructed in accordance with this invention; and Fig. 8 is a side view of a portion of the clamping ring and face plate assembly.

Referring first to Figs. 1, 2 and 3, the spindle there shown at 2 is of a common form used in lathes, and its right-hand end portion is internally shaped to receive a collet of some suitable type. The extreme end or nose 3 is tapered, as usual, to receive some kind of a work support, here shown as a face plate 4, and the inner face of the latter which abuts against the end of the spindle has a shape, in general, complemental to that of the spindle nose, so that when these parts are in their operating relationship they can be tightly secured together, free from lost motion or looseness in any direction. The face plate must revolve in unison with the spindle, and for this purpose one of these parts carries a pin, here shown at 5 secured in the face plate, which enters a hole or socket 6 in the end face of the spindle and locks the parts against relative rotation.

According to this invention the face plate is releasably secured to the spindle nose by means of a clamping ring 7, best shown in Figs. 1, 4 and 5. From these figures it will be seen that the ring includes two internal screw threads, one a continuous thread shown at 8, and the other an interrupted or segmental thread, as shown at 9. These two threads cooperate, respectively, with correspondingly threaded portions of the face plate 4 and the spindle nose. As best shown in Figs. 1 and 7, the face plate is provided on its rearward surface with an extension of annular form, internally tapered and externally threaded, as shown at 8', to take the threads 8 of the clamping ring. These threads are continuous. The other threads 9 on the clamping ring are of only very short circumferential extent say, for example, 30° each, and the correspondingly threaded sections 9' on the spindle nose, which are to cooperate with these threads 9, are made of such circumferential lengths as to provide smooth or toothless gaps 10—10, Fig. 3, through which the short threaded sections 9—9 can slide while the ring is slipped over the nose in a loosely telescoped relation to it.

In using this device, the clamping ring 7 is threaded on to the face plate 4 until it is tight, or nearly so, and the ring 7, with the face plate so secured to it, is slipped over the spindle nose with the threaded sections 9 passing through the gaps 10—'0. The face plate carries a plug 12 screw-threaded into it which engages the front face of the ring 7 as the latter is threaded on to the face plate and so limits such screw-threading operation that when the face plate and the ring have been pushed on to the spindle nose, as just described, the threads 9 will be "timed" accurately with reference to the threads 9' of the spindle so that they will intermesh with each other freely merely by giving the ring a slight rotative motion to the right (assuming that the threads are right-hand threads).

These two sets of threads 8 and 9 on the ring and their cooperating threads on the face plate and spindle nose, respectively, are made with such differences that one thread will jam on another after only a very slight rotative movement of the ring on the spindle. This result may most conveniently be accomplished by making the threads of different pitch. For examp'e, if the threads 8 and 8' have a pitch of 12 threads to the inch and the threads 9 and 9' have a pitch of 10 threads to the inch, then a relatively small rotative movement of the ring of, say, less than 30° will cause the threads 9 and 9' to pull the face plate up firmly against the end of the spindle nose and substantially simultaneously cause the threads 8 and 8' to bind or jam, thus locking the face plate and ring securely to the spindle. This action occurs because the spindle nose 3 and the face plate 4 are held against rotation, one relatively to the other, by the pin 5. Consequently, as the ring is rotated after the face plate has been put on to the spindle nose, as above described, the high pitch threads 9 and 9' force the plate inwardly toward the left, Fig. 1, but this same rotative movement of the ring tends to unscrew or loosen the threads 8 from their companion threads 8'. However, the coarser, higher pitch threads 9 and 9' tend to produce this endwise movement of the face plate at a faster rate than the lower pitched threads 8 and 8' can loosen the plate. This conflict results in the jam and the locking action just referred to because the threads 8 and 8' wedge one on another.

Preferably the ring is provided with a series of radial holes 13, Figs. 4 and 5, to receive a spanner wrench or a bar, by means of which the final tightening action of the ring can be produced.

In order to remove the face plate, it is simply necessary to turn the clamping ring in a counterclockwise direction until two index lines $a$ and $b$, Fig. 8, formed, respectively, on the edges of the ring 7 and face plate 4, come into register, at which time the ring and the face plate fastened to it can be slipped axially off the nose piece. These index lines may be marked with the word "remove," as indicated in Fig. 8.

From the foregoing it will be observed that with this construction the matter of removing the face plate from the spindle nose and replacing it with another of a different construction can be performed very quickly, with a minimum of time and labor, and that the face plate, when so secured, operates functionally as though it were a part of the spindle itself. In this connection it may be pointed out that the front face of the face plate usually is tapped with several holes, or is otherwise designed for the convenient securing thereto of various articles of work. Or, this member 4 may be a chuck of any one of numerous type, or any other suitable work supporting member.

While I have herein shown and described a preferred embodiment of my invention, it will be obvious that the principle on which the invention is based is susceptible of embodiment in other forms without departing from the spirit or scope of the invention.

Having thus described my invention, what I desire to claim as new is:

1. In a machine tool of the character described, the combination of a spindle provided with a nose, a face plate, said face plate and said spindle nose having parts cooperating to abut one against the other to hold them against relative rotation, and means for securing said face plate releasably to said spindle nose comprising a ring having two sets of internal threads, the portions of said nose and said face plate adjacent to their abutting ends being threaded to cooperate with said respective threads, one set of the threads of said ring and its cooperating threads on one of the parts to be secured together being of segmental construction to slide loosely into telescoped relation to each other, the other set of threads on said ring and its cooperating set of threads on the other of said parts to be secured together being of a different pitch from said segmental threads, whereby when the ring is rotated relatively to said nose piece and said face plate the difference in pitch of the threads will produce a jam after a short angular range of rotative movement which will lock the face plate, the spindle nose and the ring rigidly together.

2. In a machine tool of the character described, the combination of a spindle provided with a nose, said nose being formed with segmental threads, a face plate, said plate having continuous threads thereon, said face plate and said spindle nose having parts cooperating to abut one against the other to hold them against relative rotation, and means for securing said face plate releasably to said spindle nose comprising a ring having two sets of internal threads, the portions of said nose and said face plate adjacent to their abutting ends being threaded to cooperate with said respective threads, one set of the threads of said ring being segmental threads cooperating with segmental threads on said nose and the other set on said ring being continuous threads cooperating with continuous threads on said face plate, the segmental threaded sections being constructed to slide loosely into and out of telescoped relation to each other and the segmental threads being of greater pitch than the continuous threads, whereby when the ring is mounted on said spindle nose and is rotated relatively to it and to said face plate, the difference in pitch of the two sets of threads will produce a jam after a short angular range of rotative movement which will lock the face plate, the spindle nose and the ring rigidly together.

3. In a machine tool of the character described, the combination of a spindle provided with a nose, a face plate, said face plate and said spindle nose having parts cooperating to abut one against the other to hold them against relative rotation, and means for securing said face plate releasably to said spindle nose comprising a ring having two internal screw threads both threaded in the same direction, the abutting end portions of said nose and said face plate being externally threaded to receive the respective threads of said ring so that a rotative movement of the ring on said spindle nose causes one set of said threads to pull the nose and the face plate together but the threads of the other set being of a different pitch from those of the first set whereby said rotative movement causes the latter threads to jam and lock the ring to both the face plate and the spindle.

4. In a machine tool of the character described, the combination of a spindle provided with a nose, a face plate, said face plate and said spindle nose having parts cooperating to abut one against the other to hold them against relative rotation, and means for securing said face plate releasably to said spindle nose comprising a ring, said ring and the spindle nose having inner and outer threads, respectively, which are cut away at intervals so spaced that the ring may be telescoped on said nose with the threaded sections of each sliding through a cut-out section of the other, means limiting said sliding movement to bring the ribs of the threads of each of said relatively slidable members into position to enter the grooves of the threads of the other, and an additional set of threads on said ring and said face plate meshing with each other and cooperating to hold the ring and the face plate together, the two sets of threads being of different pitch so that rotation of said ring in one direction will lock said plate to said spindle nose and the other set of threads will jam on each other and lock the ring against further rotation relatively to either the face plate or the spindle nose.

FLOYD L. DODGE.

REFERENCES CITED

The following references are of record in the file of this patent:

UNITED STATES PATENTS

| Number | Name | Date |
|---|---|---|
| 1,104,044 | Goetz | July 21, 1914 |
| 2,288,864 | Whitehead et al. | July 7, 1942 |

FOREIGN PATENTS

| Number | Country | Date |
|---|---|---|
| 874,674 | France | Aug. 18, 1942 |